United States Patent

Shen et al.

[11] Patent Number: 6,147,757
[45] Date of Patent: Nov. 14, 2000

[54] APPARATUS AND METHOD EMPLOYING DEPOLARIZATION TO ELIMINATE EFFECT OF POLARIZATION DEPENDENT LOSS

[75] Inventors: Paisheng Shen, Fremont; Peter C. Chang, Mountain View, both of Calif.

[73] Assignee: Alliance Fiber Optics Products, Inc., Sunnyvale, Calif.

[21] Appl. No.: 09/255,934

[22] Filed: Feb. 23, 1999

[51] Int. Cl.[7] .................................................. G01J 4/00
[52] U.S. Cl. ............................................................. 356/364
[58] Field of Search ................................... 356/364, 350, 356/345; 385/122, 141, 142, 11, 15, 27, 28, 29, 31, 39, 123, 38; 359/333, 342, 343, 345, 346, 349, 483, 494, 498, 499, 500

[56] References Cited

U.S. PATENT DOCUMENTS

5,337,375   8/1994   Nyman et al. .............................. 385/11
5,365,337   11/1994  Page et al. ................................ 356/350
5,710,653   1/1998   Nemecek et al. ......................... 359/187

*Primary Examiner*—Frank G. Font
*Assistant Examiner*—Michael P. Stafira
*Attorney, Agent, or Firm*—Wei Te Chung

[57] ABSTRACT

An apparatus for measuring the IL (insertion loss) and the PDL (polarization dependent loss) of an optical device, includes a first switch adapted to connected to plural light sources on one side and to either a first depolarizer or a polarization controller on the other side thereof. A second switch is connected to both the first depolarizer and the polarization controller on one side and to the device under test on the other side. A detection instrument is connected to the device under test opposite to the second switch. Therefore, a first test path is set up from the light source, the first switch, the first depolarizer, the second switch, the device under test (DUT), to the detection instrument for measuring the pure IL of the DUT without the PDL involved therein, while a second test path is set up from the light source, the polarization controller, the second switch, the DUT, to the detection instrument for measuring the PDL of the DUT.

15 Claims, 6 Drawing Sheets

APPARATUS AND METHOD EMPLOYING DEPOLARIZATION TO ELIMINATE EFFECT OF POLARIZATION DEPENDENT LOSS

BACKGROUND OF THE INVENTION

1. Field of the Invention

The invention relates generally to a method and the corresponding system for measuring the insertion loss (IL) of an optical component, and particularly to the method and the corresponding system characterized to eliminate the polarization dependent of such tested component and the testing instrumentation during the IL measurement.

2. The Prior Art

Figure 1:
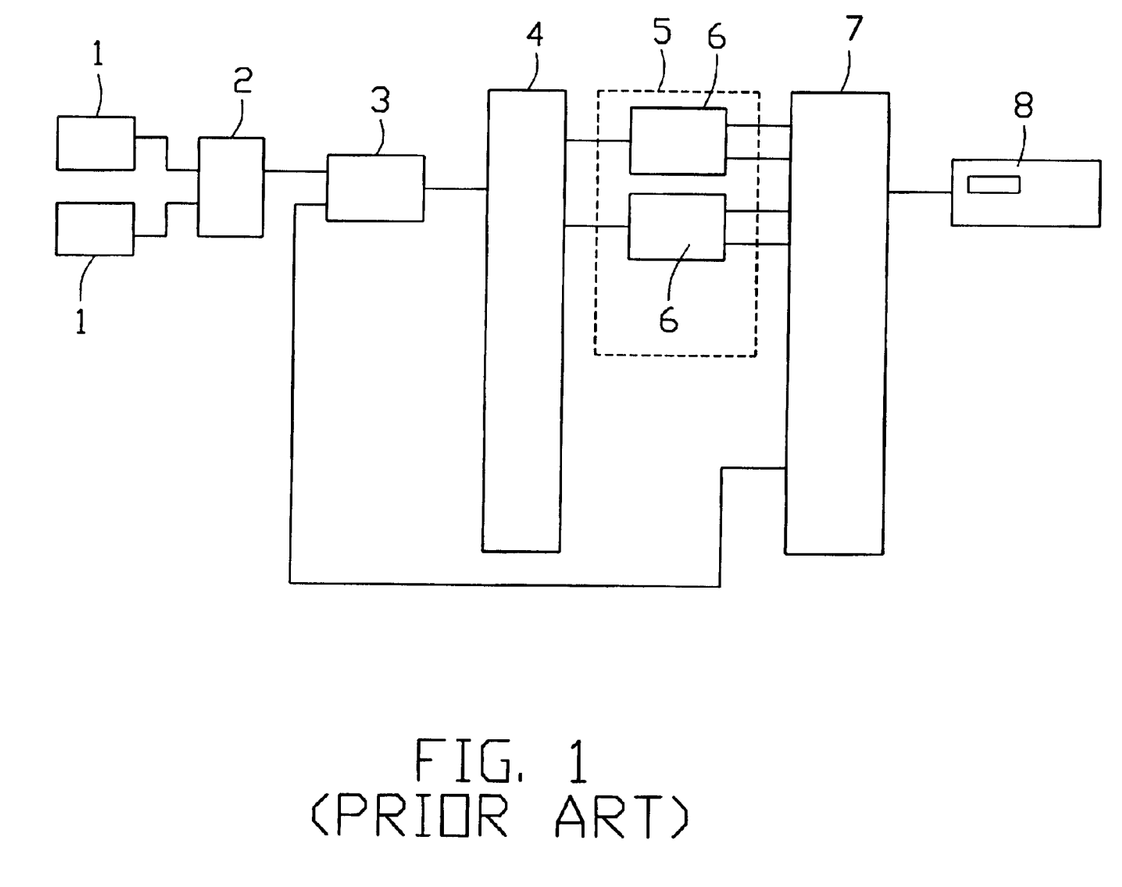
FIG. 1 shows the conventional test setup to measure IL variation of the optical device.

The Insertion loss (IL) of optical components used in a communication link defines the system's power budget and margin. Therefore, it is very important to be able to measure the IL of the optical components accurately before using them in the communication system. The IL of an optical component is defined as $$IL = 10 \log\left(\frac{P_{in}}{P_{out}}\right)$$

wherein $P_{in}$ is the optical power entering the component and $P_{out}$ is the optical power emerging from the optical component. The standard measurement procedure is what is called cutback method. The conventional test setup to measure IL variation can be referred to Bellcore GR-326-CORE, issued Dec. 1, 1994, of which the corresponding equipment and setup are shown in FIG. 1.

This traditional method includes multiple light sources 1 connected to a coupler 3 via a 2×1 switch 2. The output port of the coupler 3 is connected to a 1×N switch 4 and one of the input ports of the coupler 3 is connected to an N×1 switch 7 for back reflection measurement. A chamber 5 is positioned between the switch 4 and the switch 7 with N switching ports thereof for receiving therein N devices 6 under testing wherein each device 6 is respectively connected to the corresponding ports of the switch 4 and of the switch 7. An optical power meter 8 is connected the other side of the switch 7 to display the measured value of the selected device 6. Understandably, the 2×1 switch 2 is intended to provide two choices of the light sources and the 1×N switch 4 and the N×1 switch 7 allow to measure different N devices in this measurement system. In this system, temperature change and humility change are intentionally applied in the chamber whereby the corresponding IL values under different conditions may be obtained from the power meter 8, thus deciding characters of IL variation of the tested device 6. In order to measure the PDL of the device under test, a polarization controller could be inserted between switch 2 and the coupler 3. The inserted polarization controller is intended to create some severe polarized conditions to see the resulting measured value of the device under testing under those situations.

Even though this measurement/testing system is designed to measure the IL as accurate as possible, there is an inherent disadvantage accompanied therewith which relates to the PDL (polarization dependent loss) and is almost inevitable. The PDL for a device or a system is the maximum, peak-to-peak insertion loss due to variation caused by a component when stimulated by all possible input polarization states, wherein $$PDL = 10 \log\left(\frac{P_{max}}{P_{min}}\right)$$

with dB unit and $P_{max}$ and $P_{min}$ are the maximum and minimum optical powers measured when all possible polarization states vary. The polarization dependent loss may be characterized to include polarization sensitivity, polarization dependent gain (PDG) or extinction ratio, etc..

When testing either passive or active optical systems with polarized light, the measurement result can be highly sensitive to the polarization dependent loss (PDL) of the individual components or the even testing instrumentation. This means that the IL of the device under test (DUT) may interferes with the PDL on the test and is substantially influenced thereby. It is helpful to measure the various parameters independently for a better understanding how each parameter affects the whole performance of the device or the system. It will not only benefit the device manufacturers but also the system designers. Further more, modern devices like integrated optics or polarizing devices, are sensitive to the input polarization in their measurement of the IL. Anyhow, careful characterizations are mandatory for a better understanding of the whole design, the limited factors and potential ways for improving the performance to the required level.

Generally, the IL measurement is very stringent in a long term (for example, 14 days) Bellcore reliability during the test, which suffers not only the IL variation interfering with the PDL, but also the coherent multiple reflections resulting from bad connections and causing optical interference. In fact, without intentionally actuating the polarization controller, the pure temperature/humility changes within the chamber 5 in the test may still create somewhat polarization thereof, thereby resulting in the mixed IL and PDL simultaneously which prohibits understanding the accurate IL of the tested device. In the Bellcore test as shown in FIG. 1, the influence of the IL mixing with the PDL could be classified with three different cases. In case (1), the DUT is under a good layout situation, e.g., good and firm connection between the parts, so that the IL variation itself is dominant and plus the minor PDL caused by the same temperature/humility change cycling. In case (2), the DUT is under a bad layout situation, e.g. bad connection between two parts, so that the IL variation will mix with the middle PDL caused by the polarization fluctuation derived from such bad connection. In case (3), the polarization controller 3 is in operation for a so-called PDL test mainly measuring the PDL of the DUT, so that the PDL variation is the dominant on the test result plus the IL variation due to the temperature/humility cycling. It should be understood that the aforementioned reflection points may include the bad fusion splices, bad connections, or bad fiber pigtail end-faces, etc.. Also, the aforementioned optical interference is also sensitive to the polarization states, and degrades the system performance and measurement accuracy.

Under this complicated situation, there are two traditional ways trying to remove the PDL uncertainty from the IL test result for assuring that the testing result only reflects the IL variation without any PDL variation involved therein. One is to use a broadband, unpolarized sources, such as ASEs (U.S. Pat. Nos. 5,345,331 and 5,337,375), SLDs (U.S. Pat. Nos.4, 634,928 and 4,653,917) or LEDs. The other is to randomize the polarization states of the polarized laser (U.S. Pat. Nos. 5,408,545 and 5,359,678). The former is of the wider spectrum and thus makes it difficult to attribute a center wavelength to the single-wavelength loss measurement which is the earnest desired matter in the most tests, while the latter should be equipped with the expensive active components such as polarization generator/controller to generate all possible polarization states and averaging at the same time with a relative slow detector, which suffers extra contribution to adjust the rotation speed of the polarization generator and the samples averaging time of the receiver.

Therefore, it is strongly desired to have a method and the corresponding apparatus which may efficiently eliminate the undesired PDL from the testing system or testing result when the IL variation is tested while without the disadvantages of the prior arts.

Another object of the invention is to eliminate the PDL of not only the device under test of polarization dependency but also the testing equipment of polarization dependency, e.g. .±0.05 dB for an optical spectrum analyzer or ±0.2 dB for an optical power meter.

SUMMARY OF THE INVENTION

According to an aspect of the invention, an apparatus for measuring the IL (insertion loss) and the PDL (polarization dependent loss) of an optical device, includes a first switch adapted to connected to plural light sources on one side and to either a first depolarizer or a polarization controller on the other side thereof. A second switch is connected to both the first depolarizer and the polarization controller on one side and to the device under test on the other side. A detection instrument is connected to the device under test opposite to the second switch. Therefore, a first test path is set up from the light source, the first switch, the first depolarizer, the second switch, the device under test (DUT), to the detection instrument for measuring the pure IL of the DUT without the PDL involved therein, while a second test path is set up from the light source, the polarization controller, the second switch, the DUT, to the detection instrument for measuring the PDL of the DUT.

Yet, a second depolarizer may be optionally positioned between the DUT and the detection instrument for depolarizing the light leaving from the DUT before entering the detection instrument, if the detection instrument is polarization sensitive rather than insensitive, to eliminate the PDL of the detection instrument.

DETAILED DESCRIPTION OF THE PREFERRED EMBODIMENTS

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

Figure 2:
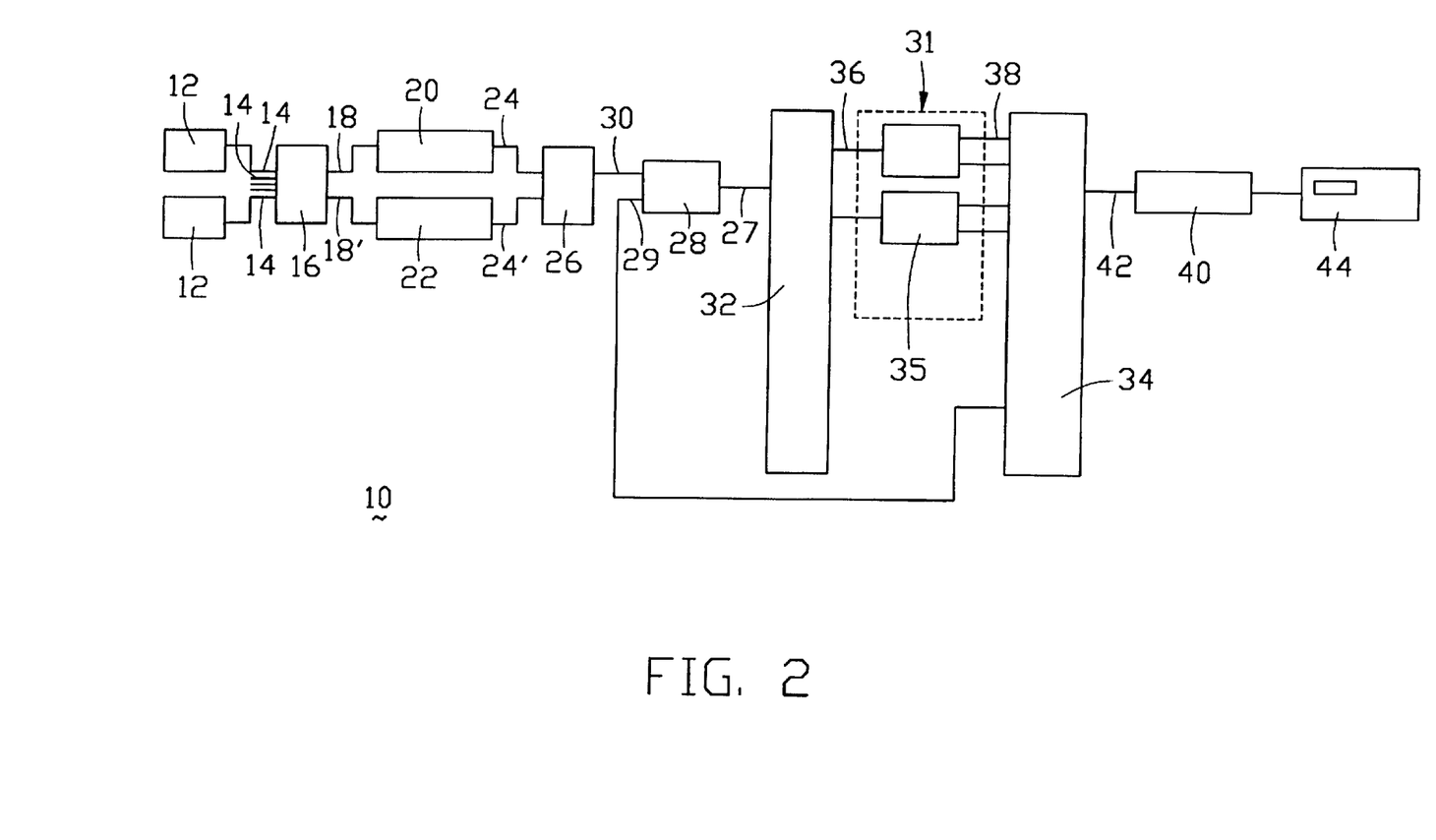
FIG. 2 shows the preferred embodiment of the testing system according to the invention.

It will be noted here that for a better understanding, most of like components are designated by like reference numerals throughout the various figures in the embodiments. Attention is directed to FIG. 2 wherein a system 10 for measuring the IL and the PDL includes a plurality of light sources 12 (only two shown) each adapted to be connected to one of the input ports 14 of an N(input)×2(output) first switch 16. One (18) of two output ports 18(18') is connected to a first depolarizer 20 and the other (18') thereof is connected to a polarization controller 22. Both of the first depolarizer 20 and the polarization controller 22 are respectively connected to input ports 24(24') of an 2(input)×1 (output) second switch 26. A coupler 28 is connected to the output port 30 of the second switch 26 whereby one port 27 of the coupler 28 is connected to an 1(input)×M(output) third switch 32, and another port 29 of the coupler 28 is directly connected to a M(input)×1(output) fourth switch 34. A plurality of DUTs 35 adapted to be installed within a chamber 31 with varying temperatures and humilities thereof, are respectively connected to the output ports 36 of the third switch 32, and each further is connected to one corresponding input port 38 of the fourth switch 34. A second depolarizer 40 is connected to the only one output port 42 of the fourth switch 34, and an optical power meter or detection instrument 44 is connected to the other side of said second depolarizer 40.

Therefore, during a test for measuring the IL of the DUT, in the first light path, the light derived from a selected one of such plural light sources 12, passes through the corresponding one of the input ports 14 of the first switch 16, the output port 18 thereof, the first depolarizer 20, the input port 24 of the second switch 26, the output 30 thereof to the coupler 28. The light depolarized by the first depolarizer further passes through the port 27 of the coupler 28, the third switch 32, and through a selected one of the output ports 36 of thereof to a selected DUT to enter a selected one input port 38 of the fourth switch 34. Then the light, which has passed the DUT under a various condition in the chamber 31, enters the second depolarizer 40 via the output port 38 of the fourth switch 34, and finally reaches the meter 44 for deployment of the detected value thereof.

Differently, if a test for measuring the PDL of the DUT is expected, in the second light path the light should take the output port 18' of the first switch 16, the polarization controller 22 and the input port 24' of the second switch 26 instead of the output port 18 of the first switch 16, the first depolarizer 20 and the input port 24 of the second switch 26 in the aforementioned first light path.

It is noted that path formed between the coupler 28 and the fourth switch 34 is a traditional device disclosed in the aforementioned conventional Bellcore testing system to measure the back reflection of the DUT, and will not illustrated herewith.

Figure 3:
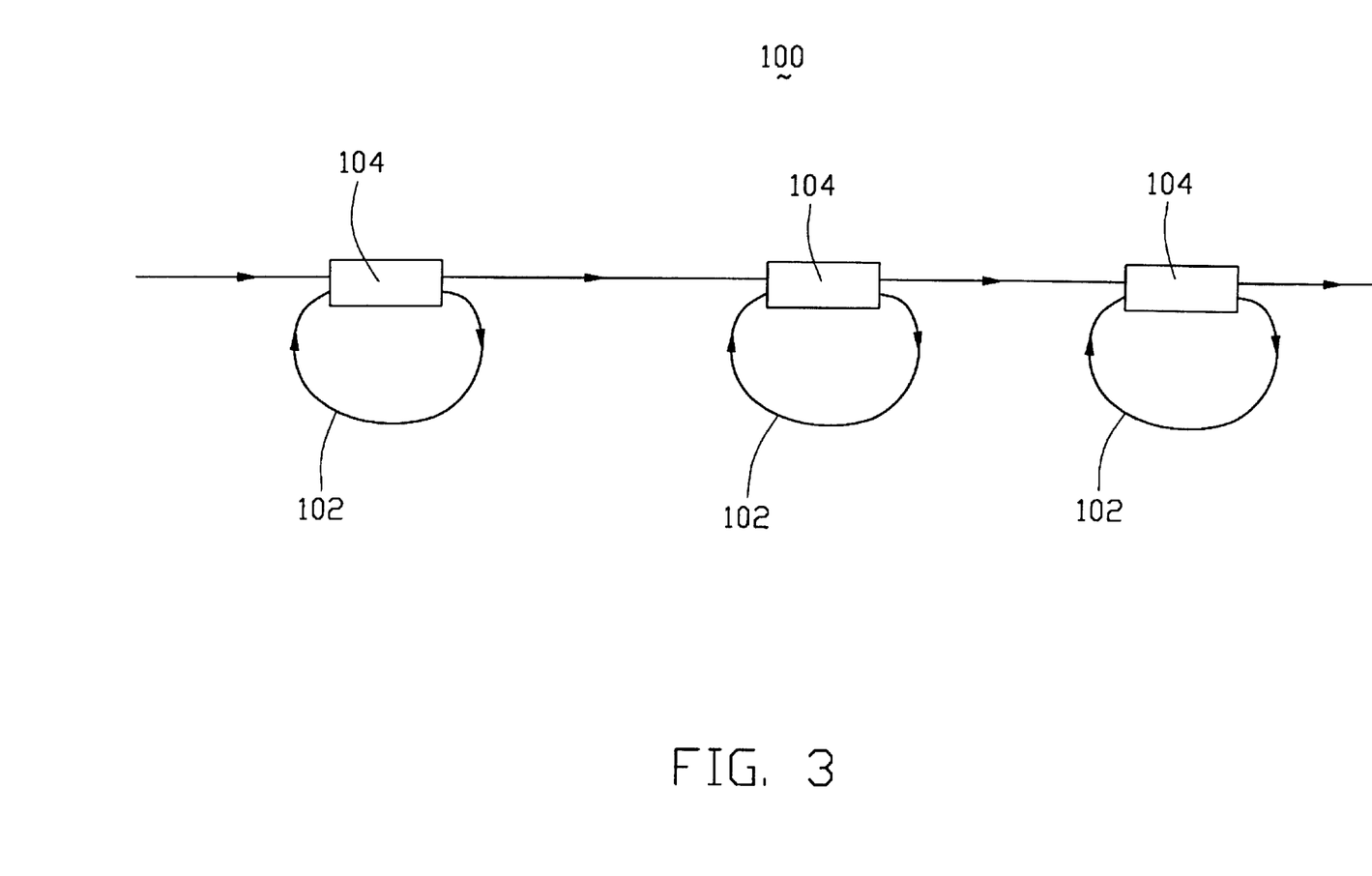
FIG. 3 shows the depolarizer for use within the system of FIG. 2.

It is also noted that as shown in FIG. 3, the depolarizer 20, 40 is of a passive type of which the structures can be referred to the copending application Ser. No. 08/847,177 filed May 1, 1997 wherein a passive single mode fiber depolarizer 100 includes cascaded fiber-ring delay lines 102 each formed by connecting one of the input and output ports of a 2×2 coupler 104 and forming a loop thereof for recirculation. To act as a depolarizer, the interferometric behavior in the ring must be negligible. Thus, to acquire this condition, the length of the fiber-ring delay line is much longer than the coherence length of the light source, i.e., $L_d \gg L_c$, where $L_d$ is the length of the fiber-ring delay line and $L_c$ is the coherence length of the light source. Under this condition, each recirculating beam passing through the fiber-ring delay line is out of coherence with all the others. Each recirculating beam will pass through different birefringence mechanism; therefore, the state of polarization of each recirculating field at the emerging port could be different. The output port is a superposition of different polarization states with different intensities. Depolarization occurs by averaging over many different polarization states of the recirculating beam. By using such a passive depolarizer, a true unpolarized beam can be obtained for working with the DUT, thus assuring no PDL will occur.

Figure 4:
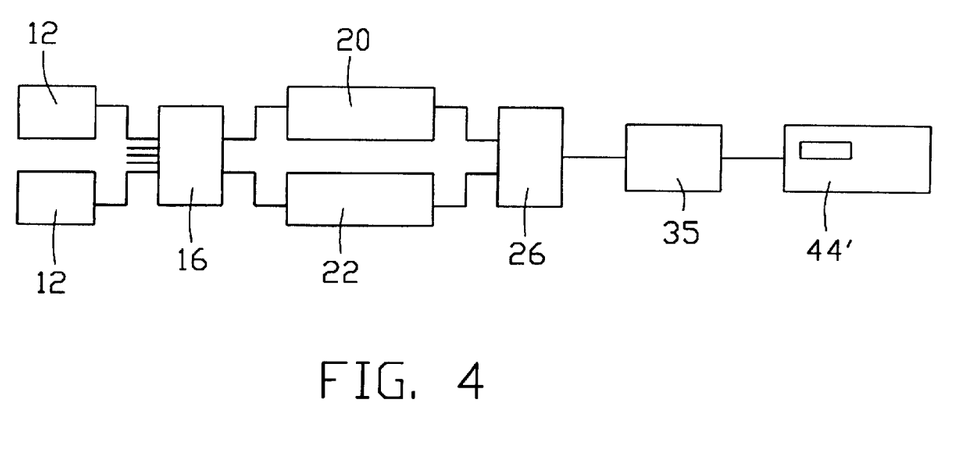
FIG. 4 shows a simplified system applied to the polarization insensitive detection instrument.
Figure 5:
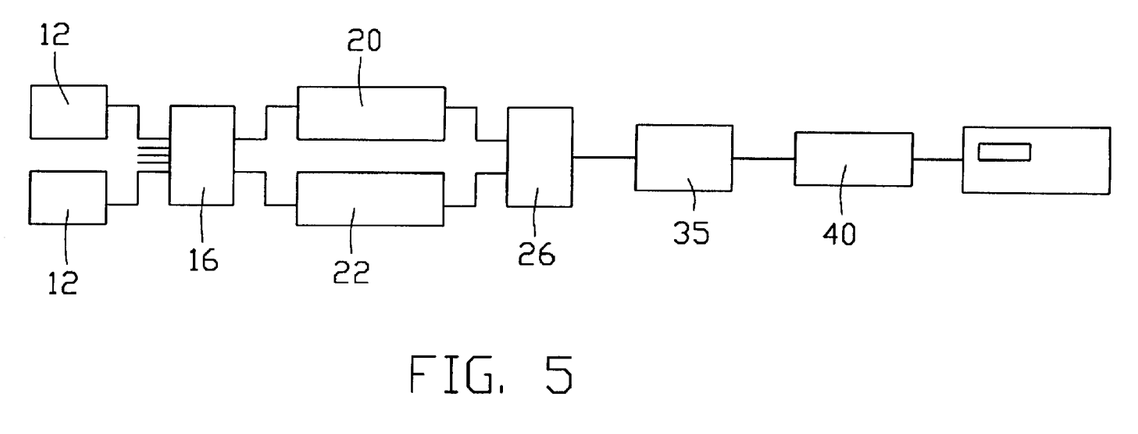
FIG. 5 shows a simplified system applied to the polarization sensitive detection instrument.

FIG. 4 shows a simplified system in which the coupler 28 and the third switch 32 and the fourth switch 34 are omitted in compliance with only one DUT located therewith. In this embodiment, because optical power meter is of a polarization insensitive instrument 44', the second depolarizer 40 can be omitted. Oppositely, FIG. 5 shows the similar simplified system with the polarization sensitive instrument 44" and the corresponding required second depolarizer 40 for cooperating therewith.

Figure 6:
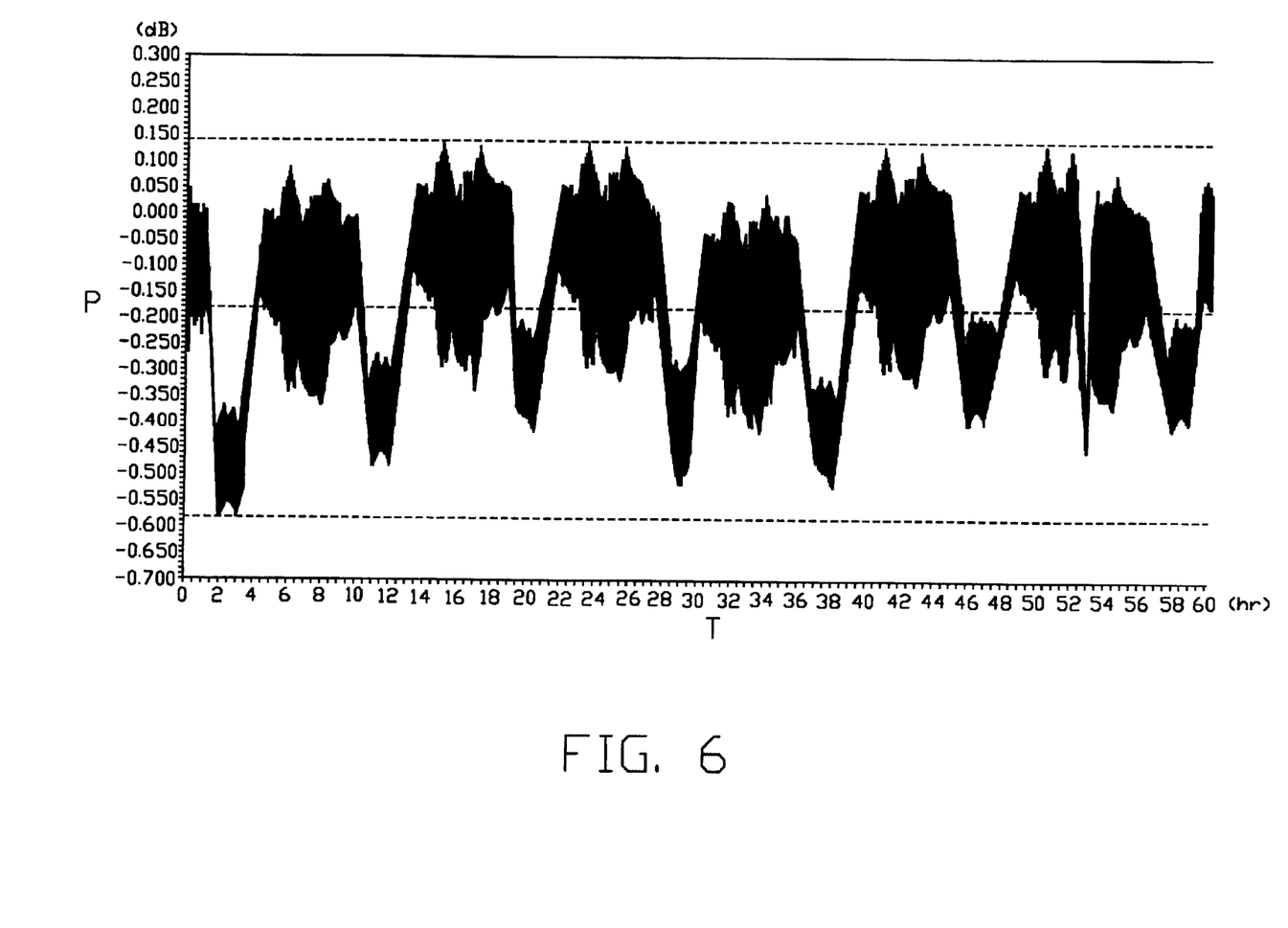
FIG. 6 shows insertion loss variation plus strong PDL.
Figure 7:
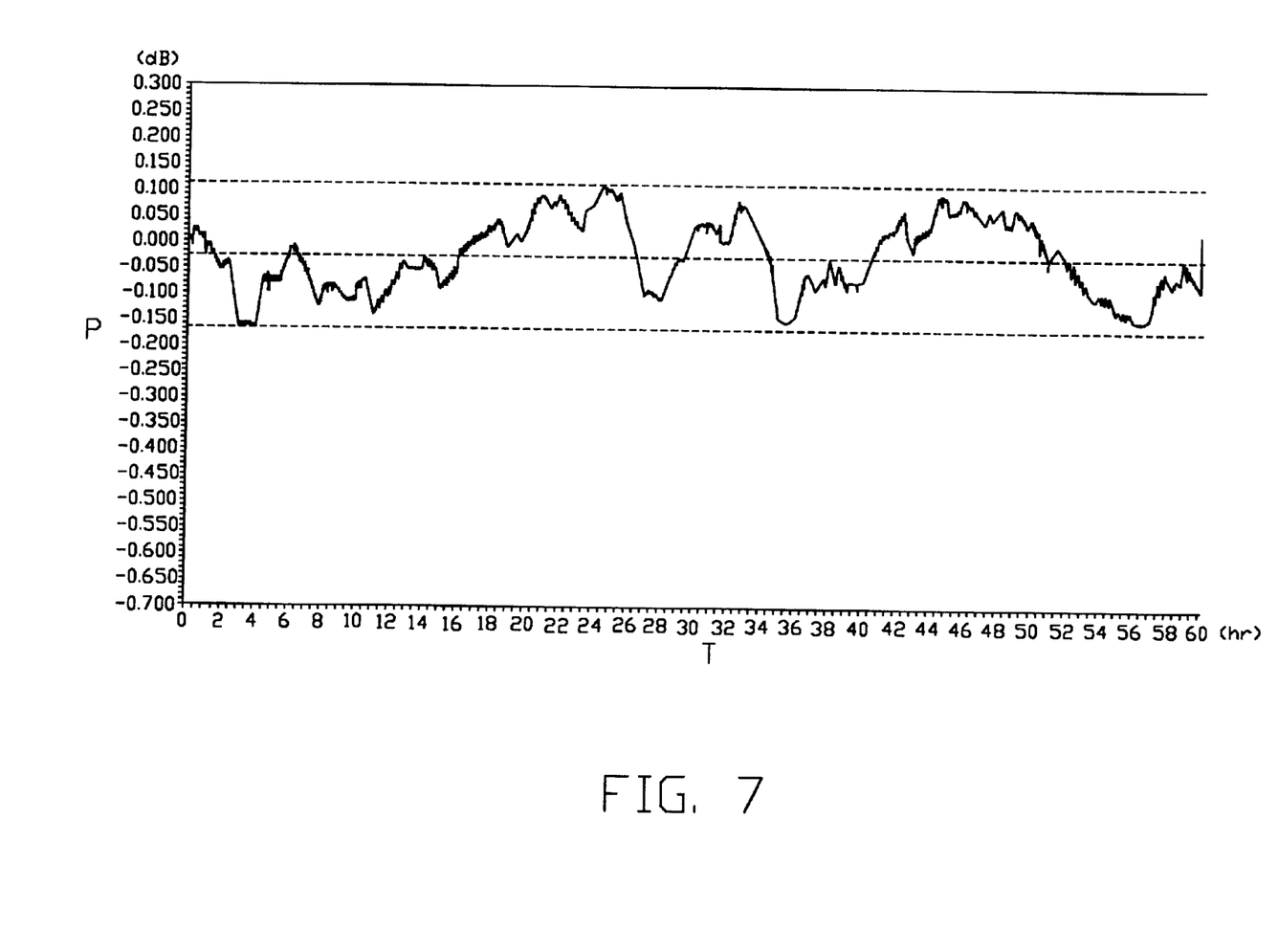
FIG. 7 shows the PDL eliminated from insertion loss variation by depolarization method.

It can be understood that DUTs may be any devices, bulk-optics, integraed-optics or fiber optics, etc.. The optical first switch 16 used to choose the light source, can be of a N×2 type of more than two light sources are required. The second switch 26 used to choose either the first depolarizer 20 for the pure IL testing, or the polarization controller 22 for the PDL testing. The third switch 32 and the fourth switch 34 are used to connect one selected DUT. It is appreciated that the first depolarizer 16 is used to depolarize the input light source and the second depolarizer is used to eliminate the polarization sensitivity of the detection instrument 44. FIG. 6 and 7 respectively show the experimentally testing result with the strong PDL and without PDL, thus proving the true depolarizeration testing system can immune the complicated PDL effect in the test.

It is noted modern components impose some unique performance requirements on the components used in the system. Enabling components are going into production, and the corresponding complexity thereof requires advanced characterization methods. The invention modifies the conventional environmental testing system by using a passive fiber depolarizer, thus efficiently removing/eliminating not only the undesired PDL effect from the IL variation measurement on the long-term environmental IL test, but also the polarization dependent loss or so-called polarization sensitivity of the detection instrument. The advantages of the invention includes easy implementation, simple testing structures and compatibility with the existing testing system, other than the main one, i.e., the pure IL value. Another remarkable advantage of the invention is to eliminate the conventional complicated situation that both the DUT and the detection instrument exhibit polarization dependence.

It can be understood that even though the embodiments disclose testing of either IL or PDL in the same system, the whole system may be simplified to be a light source, a depolarizer, the device under test and the detection instruments arranged in order wherein the depolarizer is substantially of a passive type, and specifically with a fiber-ring delay line as disclosed in FIG. 3 and disclosed in the copending application Ser. No. 08/847,177.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

We claim:

1. A system for measuring either insertion loss or polarization dependent loss of a device, comprising:
    a light source;
    a first switch connected to said light source;
    a depolarizer and a polarization controller respectively connected to the first switch, said depolarizer and said polarization controller further respectively connected to a second switch;
    the device connected to said second switch; and
    a detection instrument connected to said device.

2. The system as described in claim 1, wherein said detection instrument is a polarization insensitive instrument.

3. The system as described in claim 1, wherein a second depolarizer is positioned between the device and the detection instrument.

4. The system as described in claim 3, wherein said detection instrument is a polarization sensitive instrument.

5. The system as described in claim 1, wherein a third switch is positioned between the device and the second switch and a fourth switch is positioned between the device and the detection instrument.

6. The system as described in claim 1, wherein the first switch includes an N(input)×2(output) arrangement and the second switch includes a 2(input)×1(output) arrangement.

7. A method for measuring insertion loss of a device with polarization dependent loss involved therein during insertion loss testing, comprising the steps of:
    providing a light source;
    providing a depolarizer receiving a light from the light source;
    providing a device connected to said depolarizer; and
    providing a detection instrument connected to said device wherein the light source, the depolarizer, the device and the detection instrument are sequentially arranged with one another.

8. The method as described in claim 7, further comprising a step of providing another depolarizer between the device and the detection instrument for removing polarization sensitivity of said detection instrument.

9. The method as described in claim 7, further comprising a step of providing a polarization controller between the light source and the device for forming another path to alternately measure polarization dependent loss.

10. The method as described in claim 7, wherein said depolarizer is of a passive type.

11. The method as described in claim 10, wherein said depolarizer includes cascaded fiber-ring delay lines each to form a loop for recirculation.

12. The method as described in claim 9, further comprising a step of providing a first switch and a second switch by two sides of both the depolarizer and the polarization controller, respectively.

13. A simplified system for measuring a pure insertion loss of a device, comprising:
    a light source;
    a passive type depolarizer connected to said light source, the device connected to said depolarizer; and a detection instrument connected to said device; wherein
a polarization controller is positioned between the light source and the device in a parallel relation with the depolarizer to form another light path so that the system can alternately and mutually exclusively operate with either the depolarizer or the polarization controller for measuring either insertion loss or polarization dependent loss.

14. The system as described in claim 13, wherein another depolarizer is disposed between the device and the detection instrument.

15. The system as described in claim 13, wherein said depolarizer includes cascaded fiber-ring delay lines each for forming a loop thereof for recirculation of light.

* * * * *